United States Patent [19]

Pavlas

[11] 4,162,034

[45] Jul. 24, 1979

[54] EJECTOR CONTROLLED SOLDERING DEVICE

[75] Inventor: Emil P. Pavlas, Villa Park, Ill.

[73] Assignee: Western Electric Company, Incorporated, New York, N.Y.

[21] Appl. No.: 902,612

[22] Filed: May 3, 1978

[51] Int. Cl.² .............................................. B23K 3/06
[52] U.S. Cl. ....................................... 228/37; 228/20; 118/429
[58] Field of Search ...................... 228/37, 19, 264, 20; 118/421, 429

[56] References Cited

U.S. PATENT DOCUMENTS

| | | | |
|---|---|---|---|
| 1,272,358 | 7/1918 | Bell | 228/33 |
| 2,387,736 | 10/1945 | Bierman | 228/429 X |
| 2,993,272 | 7/1961 | Carlzen et al. | 228/37 |
| 3,277,566 | 10/1966 | Christensen | 228/37 X |
| 3,684,151 | 8/1972 | Burman et al. | 228/19 |
| 3,765,591 | 10/1973 | Cook | 228/36 |
| 3,874,068 | 4/1975 | Cook | 228/37 X |

OTHER PUBLICATIONS

Advertiser's Brochure (undated) — Air-Vac Engineering Co. Inc. "Module Components" Sheet RS-14 (Model PCBRM-6).
"A Short Course on Transvector ™ Air Flow Amplifier with Application Notes" Vortex Corporation (undated) pp. 1-3.

*Primary Examiner*—Francis S. Husar
*Assistant Examiner*—Kenneth J. Ramsey
*Attorney, Agent, or Firm*—R. P. Miller

[57] ABSTRACT

Solder is forced through an ejector and flow well to impinge a solder fountain against soldered leads extending through a circuit board from a component. The solder on the leads is melted to permit the removal and replacement of the component. Overflowing solder is collected and recirculated by action of the ejector. The construction of the solder fountain is such that there are no close fitting moving parts which may become clogged by solder inclusions.

10 Claims, 2 Drawing Figures

EJECTOR CONTROLLED SOLDERING DEVICE

TECHNICAL FIELD OF THE INVENTION

This invention relates to a non-clogging ejector controlled soldering device and, more particularly, to a device for forcing solder through an ejector to impinge against selected sites on a circuit board to permit the soldering or de-soldering of components to circuit paths formed on the board.

BACKGROUND ART

In the manufacture of many types of electrical assemblies, there is a need to apply solder at a particular site to either de-solder a device positioned at the site or solder a device placed at the site. One particular problem area resides in the manufacture of complex circuit boards where vast arrays of integraged circuits, resistors, capacitors and other types of semi-conductive devices are solder connected to circuit pads or terminals formed on the board and it becomes necessary to replace a a defectively connected device without damaging or disturbing adjacent devices. In such removal procedures, precaution must be taken to preclude damage to the circuit board and any plated through holes formed in the board.

At present the usual procedure contemplates use of a hand soldering iron in conjunction with a vacuum solder removal device which are used to melt and remove the solder to permit withdrawal of the defective device and the replacement with a new device. In some instances the board or a large number of components mounted on the board are defective, necessitating a junking of the board. Prior to such junking, good economics requires some procedure to remove the non-defective components from the board.

There are soldering devices available to apply molten solder to a particular site on a circuit board. One such device is marketed by Air-Vac Engineering Co., Inc., Milford, Conn., in which solder is forced from a well to apply a solder fountain against a selected site on a circuit board. In this device a piston moves through a chamber to force solder up through the well to form the fountain which overflows and is collected in a chamber surrounding the cylinder. The piston is driven by a rod acting through close-fitting bearings mounted in the bottoms of the cylinders and the chamber containing the solder. A port is formed in the cylinder wall and is valved by the piston to permit the flow of excess solder from the overflow chamber back into the cylinder.

In U.S. Pat. No. 1,272,358 there is disclosed a soldering device in which pressurized air is impinged on a contained solder pool so that solder is forced from the pool through a tube to a soldering site. Overflow solder is collected and returned through a valve to the pool.

As the printed circuit board art has developed, numerous types of wave soldering devices have been developed to mass solder large numbers of components having leads extending through the boards to circuit paths and pads formed on the board. Again, these devices depend for operation upon the use of various types of pumps which have closely fitted parts exposed to contaminants, such as fluxes, in the molten solder.

In these prior art devices, pumps and valves of one sort or another are utilized wherein the moving parts are closely fitted to move along or into bearing or seating surfaces. Experience has demonstrated that these devices need frequent servicing because of inclusions from the solder being deposited between the tight-fitting moving or engaging surfaces.

SUMMARY OF THE INVENTION

This invention contemplates, among other things, a non-clogging solder applicator devoid of any tight-fitting moving parts.

More particularly, in one embodiment of the invention, a bellows is expanded in a solder filled first chamber to force the solder through an ejector and, then, through a well to form a solder stream which may be impinged on a selected site on a circuit board to de-solder an electrical device located at the site. Solder overflowing from the well is collected in a second chamber which surrounds the well. Actually, the two chambers are separated by a divider plate which is spaced from the lower end of the ejector.

When the bellows is expanded, the solder is forced through the ejector, and there is a drop in pressure so that solder is drawn from the second chamber to join the main stream of solder being forced up through the well. When the bellows is contracted, solder in the overflow second chamber is permitted to flow through the space between the ejector and the divider wall back into the first chamber.

In the operation of the device, there are no tightly fitted moving parts; hence, there are no parts to be clogged. Further, the movement of the solder through the ejector serves to clean the surface of the ejector and maintain the space between the ejector and the divider plate clear of any clogging material.

BRIEF DESCRIPTION OF THE DRAWINGS

Other features and advantages of the present invention will be apparent upon consideration of the detailed specification and the drawings, wherein.

DETAILED DESCRIPTION

Figure 1:
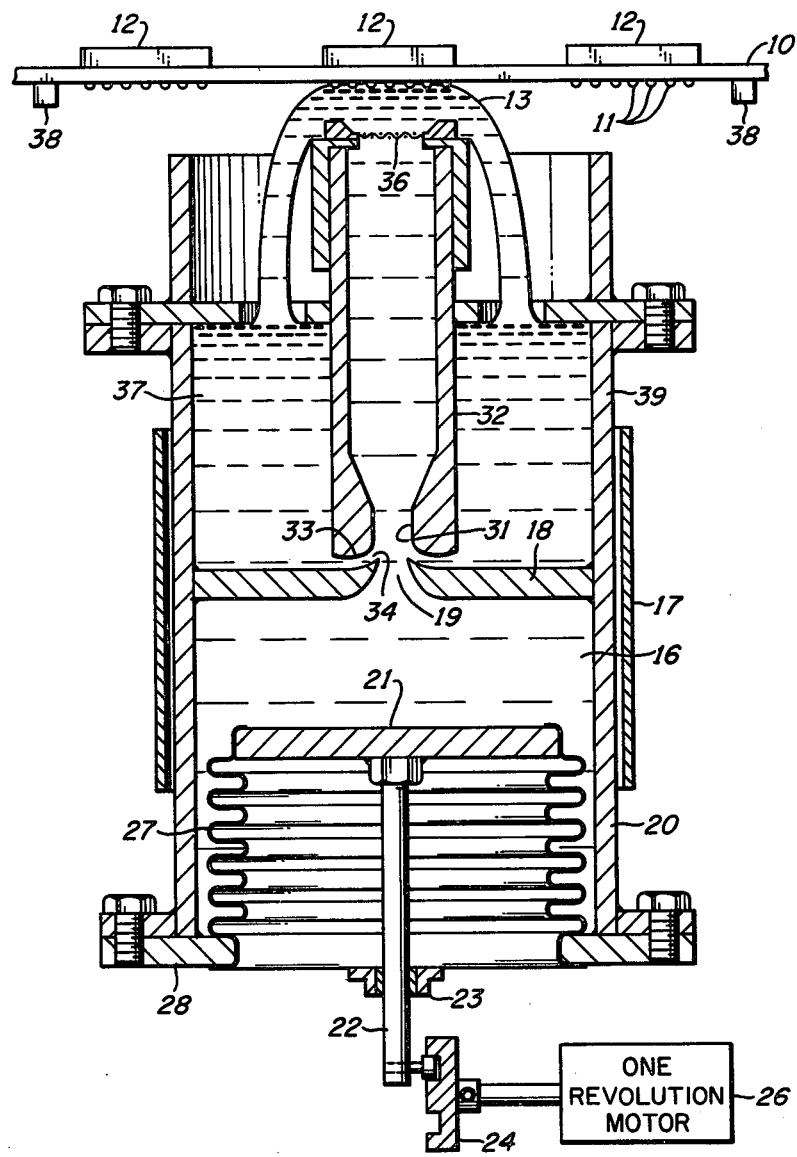
FIG. 1 is a side sectional view of one embodiment of the invention wherein solder is forced by an expanding bellow to flow through an ejector to form a solder fountain.

Referring now to FIG. 1, there is shown a circuit board 10 which may be constructed of epoxy glass, or phenol fiber. This board has printed circuit paths, pads or terminals formed on the underside thereof to which are soldered leads 11 extending through holes formed in the board from components 12. These components may take many forms, such as DIPs (Dual In-line Packages) resistors, integrated circuits, capacitors or other electrical devices. The device shown in FIG. 1 is designed to impinge a solder wave or fountain 13 against an array of leads 11 to permit the removal of a defective device 12. Subsequent thereto, a good device is mounted on the board so that the leads project through the board to permit the fountain 13 to solder these leads to the appropriate circuit paths or pads.

The soldering device comprises a first chamber 16 for receiving a supply of solder which is maintained in a molten state by an electrical heating device designated by the reference numeral 17. The upper extremity of the chamber 16 is defined by a plate 18 having an inwardly tapered aperture 19 formed therein and the outer extremity is defined by a peripheral wall 20. Positioned within the chamber 16 is a piston plate or bellows head 21 attached to a piston rod or shaft 22 supported for reciprocating motion by a bearing 23. The piston rod 22 may be reciprocated by any suitable means, such as a face cam 24 driven by a one-revolution motor 26 or a fluidic cylinder. Attached to the periphery of the piston plate 21 is a stainless steel bellows 27 which is secured at its other extremity to a flange 28 forming the lower wall of the chamber 16.

When the piston plate 21 is moved upwardly, molten solder is forced through the aperture 19. This aperture 19 has a sloping, curved wall which tapers inwardly toward the upper surface of the plate to facilitate nonturbulent flow of the solder and to prevent the the trapping of an air bubble. Solder passing through the aperture 18 enters a necked down throat 31 of a flow tube or well 32. It will be noted that the necked down throat 31 has an internal diameter corresponding to but slightly larger than the diameter of the aperture 19 at the top of the divider plate 18. The throat 31 has its lower extremity 33 spaced from the upper surface of the divider plate 18 to provide a flow opening 34.

As the solder is forced through the well 32, it passes through a stainless steel screen 36 which acts to level the fountain 13 and preclude eruptions and spattering of the solder. The overflowing solder drops into a second chamber 37 having an outer wall 39 which may be a continuation of the wall 20 for the chamber 16. The solder falling into the chamber 37 is also heated by the heating device 17. The contoured aperture 19 and the spaced necked down throat 31 act as an ejector so that the pressure of the solder passing through the ejector is reduced and, as a consequence thereof, solder is drawn or aspirated through flow opening 34 from the chamber 37 to increase the volume of solder flow.

When the bellows head 21 is withdrawn, solder is moved from the well 32 through the aperture 19, and at the same time solder from chamber 37 flows through opening 34 and aperture 19 into the chamber 16. In effect, the opening 34 is used as a valve to meter additional solder into the solder stream during upward movement of the solder in the well 32, and also meters solder into the solder stream being withdrawn into the chamber 16.

The shape and diameter of the ejector throat 31 and the contoured walls of the aperture 19 are selected and designed in such a way that sufficient speed of solder is assured to attain the ejector effect; while at the same time, there is sufficient opening 34 to allow the movement of solder back into the chamber 16 during withdrawl of the bellows head 21. Satisfactory results may be obtained with a throat diameter of 6 mm and a spacing of 2 mm between the lower end 33 of the throat and the upper surface 34 of the plate 18.

Recapitulating briefly on the operation of the soldering device, the circuit board is positioned in a fixture or on supports 38 so as to locate a defective component (e.g., DIP) in position to have the solder fountain 13 act on the soldered leads 11. Motor 26 is then energized to cause the bellows head to move upwardly while the bellows 27 freely expands.

The pressurized solder is forced through the aperture 19 and the necked down throat 31 so that there is increase in linear velocity of solder with respect to the velocity of the solder being pushed upwardly in the chamber 16. With the increase in velocity of the solder, there is a concomitant drop in static pressure which is effective to withdraw additional solder through opening 34 from overflow chamber 37. Thus there is a higher volume of solder exiting from the well than the volume of solder withdraw from the chamber 16.

The solder is then forced up through the flow well 32 and the screen 36 to form the solder fountain 13. The solder fountain 13 melts or softens the solder on the leads 11 permitting the attending operator to remove the defective component. A new component 12 is placed in position with its leads 11 extending through the board and the motor is reenergized to again impinge the solder fountain on the leads which are soldered to the circuit paths.

Figure 2:
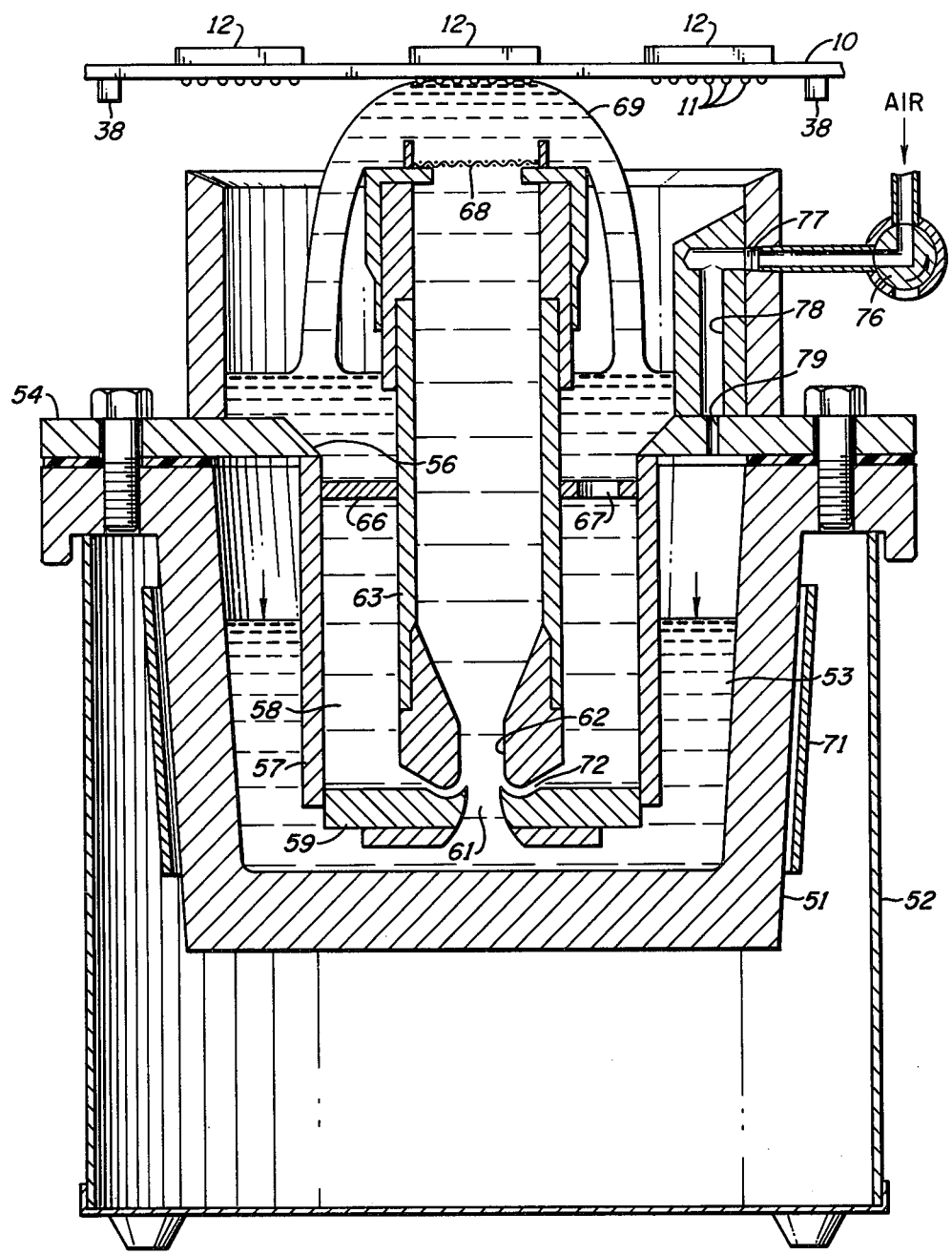
FIG. 2 is a side sectional view of a second embodiment of the invention wherein solder is forced by air pressure through an ejector to form a solder fountain.

Referring now to FIG. 2, there is again shown a circuit board 10 having soldered leads 11 extending therethrough from components 12. In this embodiment of the invention, all moving parts have been eliminated and the ejector effect is again utilized to provide a nonclogging solder fountain. A solder pot 51 is shown supported in a housing 52. Solder pot 51 provides a chamber 53 for receiving a supply of solder. A cover plate 54 is attached to the solder pot and is provided with a central opening 56. Depending from the plate 54 about the opening 56 is a cylinder 57 which forms the outer wall of a second chamber 58. Cylinder 57 supports a divider wall 59 having a centrally disposed aperture 61 which is contoured or shaped similar to the aperture 19 considered with respect to the embodiment shown in FIG. 1. Aligned with aperture 61 and spaced therefrom is a necked down throat section 62 formed or secured to the lower end of a flow well 63. Flow well 63 may be supported by ring plate 66 secured to the inner walls of the cylinder 57.

The ring 66 is provided with a number of apertures 67 to permit the flow of solder into the chamber 58. The flow well 63 is capped again by a stainless steel screen 68 to level the solder fountain 69. An electrical heater 71 surrounds the pot 51 to maintain the solder in molten condition in all chambers. Again the lower extremity of the throat section 62 is concentric with the aperture 61, and is spaced therefrom to provide a flow opening or space 72. This soldering device is controlled by pressurized air admitted through a valve 76 into a port 77 communicating with a passageway 78 that runs to an aperture 79 formed in the plate 54.

In operation of this soldering device, pressurized air is applied through aperture 79 to impinge upon the upper surface of the solder in chamber 53. The pressurized solder is forced through aperture 61 and necked down throat 62 which cooperate to act as an ejector and, thus, draw additional solder from chamber 58 through flow opening 72. The flow of solder through opening 72 results from the fact that the static pressure of the solder passing through the ejector throat is reduced while its speed is increased. The solder emanates from the ejector throat into the well 63 and flows through the screen 68 to form the fountain 69. Overflowing solder is collected in the chamber 58, and a portion of which will subsequently again flow through the opening 72 to be recirculated with the solder being forced from chamber 53.

When the solder impinges on the soldered leads 11, the solder thereon is melted permitting an attending operator to remove the defective component 12. Immediately thereafter a good replacement component may be placed on the board 10 with the leads 11 extending through the board so that the solder fountain 69 solders these leads to the circuit pads and paths formed on the underside of of the board 10.

Following a soldering and/or de-soldering operation, the air stream is cut off whereupon atmospheric air is admitted through valve 76 to again restore atmospheric pressure on the upper surface of the solder in the chamber 53. Inasmuch as the solder levels in flow well 63 and chamber 58 are at higher levels than the solder in the chamber 53, the solder will again flow through aperture 61 in a reverse direction to restore equilibrium between the levels of solder in chambers 58 and 53. During this time, solder from chamber 58 is valved through opening 72 into aperture 61 and then into chamber 53.

Inasmuch as there are no moving parts in this soldering device, there is no possibility of parts becoming clogged to interfere with the operation of the device. Further, the flow of solder through the necked down throat 62 and the opening 72 at very high speeds insures that these elements will be continuously cleaned and, hence, free of clogging problems.

I claim:

1. A solder fountain apparatus, which comprises:
   a flow well having a necked down throat at the lower end thereof;
   a plate having an opening aligned with and spaced from said throat;
   means for applying pressurized solder through said opening and said throat to flow through and out the upper end of said well; and
   means for collecting the overflowing solder about said space between said throat and plate so that portions of said overflow solder are drawn through said space and into said throat by the solder flowing through said throat.

2. A solder fountain apparatus as defined in claim 1, which comprises:
   a chamber including said plate for containing a supply of solder; and
   said pressurizing means applies forces to move said solder from said chamber and through said opening and throat at a reduced pressure to draw the solder through said space.

3. A solder fountain apparatus, as defined in claim 2, wherein said chamber is positioned below said opening, and which comprises:
   a bellows head movably mounted in said chamber; and
   a bellows interconnected between the side of said bellows head and the bottom of said supply of said solder in said chamber.

4. A solder fountain apparatus, as defined in claim 2, wherein said collecting means is a second chamber having said plate as a bottom.

5. A solder fountain apparatus as defined in claim 2, wherein said chamber extends around and above the throat to maintain solder in said opening; and
   said pressurizing means comprises means for applying a pressurized fluid to the upper surface of the solder in said chamber.

6. A solder fountain apparatus as defined in claim 5, which comprises:
   a second chamber extending into said first chamber and having said plate as a bottom.

7. A solder fountain, which comprises:
   a flow well having a reduced throat section on the lower end thereof;
   a plate spaced from the lower end of said well and having a hole formed therein of a diameter slightly smaller than the diameter of the lower portion of the throat, said hole being tapered inwardly toward the throat section;
   means for collecting solder overflowing from said well in and about the space between said throat and said plate; and
   means for pressurizing and forcing solder through said hole and said throat to flow said solder up and out of said well, whereupon the flow of solder through said hole and throat reduces the pressure thereof to aspirate solder through the space between said throat and plate.

8. A soldering device, which comprises:
   a first chamber for receiving solder;
   a second chamber for receiving solder;
   a plate separating the first and second chambers and an aperture formed therein for the passage of solder between said chambers;
   a flow well extending into the first chamber and having a necked down section at the lower extremity thereof which is aligned with and spaced from said aperture; and
   means for pressuring solder in the second chamber to flow through the aperture, the necked down section, the flow well and exit therefrom as a fountain, the solder from the fountain falling into said first chamber, said solder flowing through said necked down section experiencing a drop in static pressure to cause a flow of solder from the first chamber through the space between the necked down section of the flow well and said plate.

9. A solder fountain, which comprises:
   a first solder pot having an upper divider wall with an aperture formed therein;
   a second solder pot having a lower wall defined by said divider wall;
   a flow well extending into said second solder pot and having a necked down lower section spaced from and aligned with said aperture; and
   means for selectively applying and relieving forces on solder in said first solder pot whereupon the applied forces flow solder through said necked down section to draw solder from said second solder pot through the space between said necked down section and said divider wall, and the relieving of said forces effects the withdrawal of solder from said second solder pot through said space and said aperture into said first solder pot.

10. A solder fountain, comprising:
    first and second solder pots having a common lower and upper divider wall with an aperture formed therein;
    a flow well extending into said first pot and having a necked down throat section at the lower end thereof which is spaced from and concentrically located with respect to said aperture;
    said aperture and necked down throat section being contoured to provide an ejector for drawing solder through the space between the throat section and the common divider wall, said space also acting as a valve for the flow of solder from said first solder pot to said second solder pot; and
    means for applying forces on solder in said second solder pot to flow a solder stream through said well to overflow into said first solder pot, whereupon the ejector withdraws solder through said space into the solder stream, and for relieving said forces whereupon solder is valved from said first solder pot into said second solder pot.

* * * * *